US010207653B1

(12) United States Patent
Terzich

(10) Patent No.: US 10,207,653 B1
(45) Date of Patent: Feb. 19, 2019

(54) STOWABLE TIERED ELECTRONIC DEVICE HOLDER

(71) Applicant: Smart Product Innovations, LLC, Scottsdale, AZ (US)

(72) Inventor: Zoran Terzich, Northbrook, IL (US)

( * ) Notice: Subject to any disclaimer, the term of this patent is extended or adjusted under 35 U.S.C. 154(b) by 0 days.

(21) Appl. No.: 15/985,527

(22) Filed: May 21, 2018

(51) Int. Cl.
| | |
|---|---|
| B60R 11/02 | (2006.01) |
| A45F 5/00 | (2006.01) |
| F16M 13/02 | (2006.01) |
| F16M 13/04 | (2006.01) |
| H04M 1/06 | (2006.01) |
| B60R 11/00 | (2006.01) |
| B64D 11/00 | (2006.01) |

(52) U.S. Cl.
CPC ......... *B60R 11/0252* (2013.01); *A45F 5/00* (2013.01); *F16M 13/02* (2013.01); *F16M 13/04* (2013.01); *H04M 1/06* (2013.01); *A45F 2200/0516* (2013.01); *A45F 2200/0525* (2013.01); *B60R 11/02* (2013.01); *B60R 2011/0015* (2013.01); *B60R 2011/0075* (2013.01); *B60R 2011/0082* (2013.01); *B64D 11/00152* (2014.12)

(58) Field of Classification Search
CPC ..... B60R 2011/0015; B60R 2011/0082; B60R 2011/0241; B60R 2011/0252; B60R 2011/0075; B64D 11/00152
USPC .................. 224/275, 929; 297/217.3, 188.04
See application file for complete search history.

(56) References Cited

U.S. PATENT DOCUMENTS

| | | | | |
|---|---|---|---|---|
| 6,056,175 | A * | 5/2000 | Mieglitz ............... | B60K 37/04 224/282 |
| 6,142,561 | A * | 11/2000 | Pesta .................. | B60N 2/01508 248/304 |
| 6,179,263 | B1 * | 1/2001 | Rosen ................. | B60R 11/0235 248/278.1 |
| 8,210,605 | B2 * | 7/2012 | Hough ................ | B60R 11/0252 297/188.05 |
| 8,777,173 | B2 * | 7/2014 | Nemoto .................. | B60R 11/02 224/929 |
| 9,045,096 | B2 * | 6/2015 | Procter ............... | B60R 11/0235 |
| 9,764,841 | B2 * | 9/2017 | Ferris ............... | B64D 11/00152 |
| 9,919,659 | B2 * | 3/2018 | Kipp .................... | B60N 2/2222 |
| 2005/0204596 | A1 * | 9/2005 | Peng ........................ | G09F 9/00 40/320 |
| 2007/0222248 | A1 * | 9/2007 | Maulden ............. | B60R 11/0252 296/37.15 |
| 2008/0245833 | A1 * | 10/2008 | Vacity .................... | B60R 7/043 224/275 |
| 2011/0278885 | A1 * | 11/2011 | Procter ............... | B60R 11/0235 297/135 |
| 2015/0115009 | A1 * | 4/2015 | Stauber .................. | B60R 11/02 224/275 |

(Continued)

FOREIGN PATENT DOCUMENTS

| | | | | |
|---|---|---|---|---|
| FR | 3045530 B1 * | 1/2018 | ............. | B60N 3/004 |
| WO | WO 2016012693 A1 * | 1/2016 | ............. | B60N 3/004 |

*Primary Examiner* — Justin Larson

(57) ABSTRACT

A stowable tiered electronic device holder supports electronic devices in a variety of shapes and sizes, in at least a portrait and landscape orientation. The stowable tiered electronic device holder comprises an electronic device holder having plurality of brackets positioned along a tapering path that hold the electronic devices. A compartment receives the electronic device holder and the electronic device holder is extendable and retractable relative to the compartment.

10 Claims, 7 Drawing Sheets

(56) References Cited

U.S. PATENT DOCUMENTS

| | | | |
|---|---|---|---|
| 2016/0137140 A1* | 5/2016 | Lee | B60R 11/0252 |
| | | | 297/188.05 |
| 2016/0257404 A1* | 9/2016 | Ferris | B64D 11/00152 |
| 2017/0174146 A1* | 6/2017 | Kipp | B60R 11/02 |
| 2018/0072424 A1* | 3/2018 | Irons | B64D 11/00152 |
| 2018/0222400 A1* | 8/2018 | Neumann | B60R 11/02 |

* cited by examiner

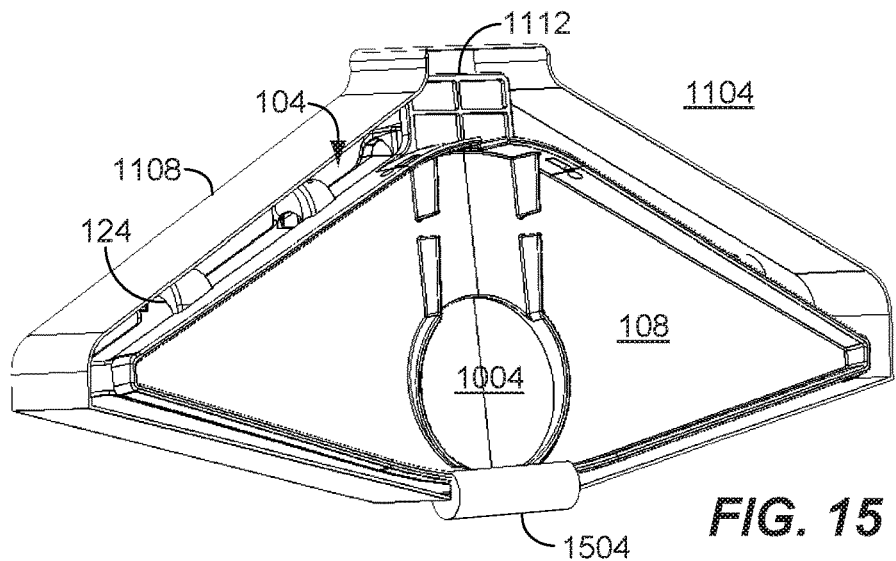
*FIG. 15*
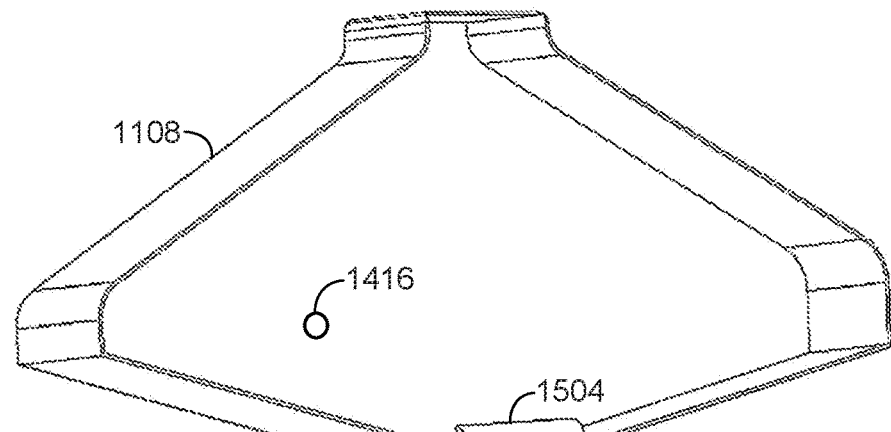
*FIG. 16*
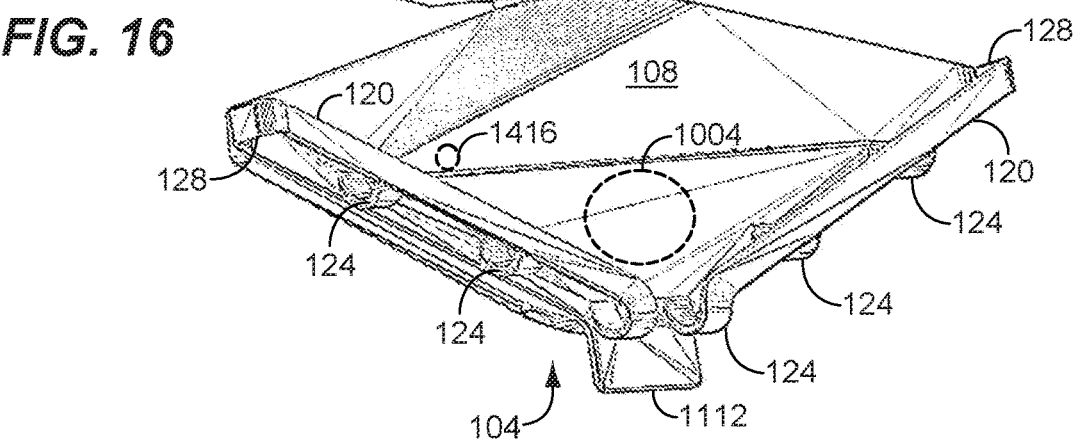

STOWABLE TIERED ELECTRONIC DEVICE HOLDER

BACKGROUND OF THE INVENTION

1. Field of the Invention

The invention relates to supports for electronic devices and in particular to a tiered electronic device holder.

2. Related Art

Electronic devices, such as smartphones, tablets, portable gaming machines and media players are typically handheld. In some situations, users desire hands free operation whereby an electronic device can be used without holding the electronic device.

From the discussion that follows, it will become apparent that the present invention addresses the deficiencies associated with the prior art while providing numerous additional advantages and benefits not contemplated or possible with prior art constructions.

SUMMARY OF THE INVENTION

A stowable tiered electronic device holder is disclosed herein. The stowable tiered electronic device holder allows a variety of electronic devices to be supported in an upright position for handsfree operation. An electronic device may be supported in portrait or landscape mode. In addition, a wide variety of electronic devices in various shapes and sizes can be supported by the same tiered electronic device holder.

The stowable tiered electronic device holder may is retractable and extendable from a compartment of a seat back or other housing. In this manner, the stowable tiered electronic device holder may be retracted when not in use or when required by applicable air travel or other regulations. This improves safety for passengers. When desired, the stowable tiered electronic device holder may be extended to receive and support an electronic device.

Various embodiments of a stowable electronic device holder are disclosed herein. For instance, in one exemplary embodiment a stowable electronic device holder comprises a housing and an electronic device holder. The electronic device holder comprises a body having a tapered portion and a plurality of pairs of brackets. Each of the brackets in the plurality of pairs of brackets have the same vertical position and arranged along the tapered portion.

A compartment in the housing receives the electronic device holder while permitting the electronic device holder to be movable between a retracted position and extended position relative to the compartment. It is contemplated that a wireless charging device may be provided at the body. In addition, the compartment may be shaped such that it corresponds to a peripheral shape of the electronic device holder.

In another exemplary embodiment, the stowable electronic device holder comprises an electronic device holder comprising a body having a tapered portion and a plurality of pairs of brackets. Similar to above, each of the brackets in the plurality of pairs of brackets have the same vertical position and arranged along the tapered portion. A compartment receives the electronic device holder while permitting the electronic device holder to be movable between a retracted position and extended position relative to the compartment.

A variety of related methods are disclosed herein as well. For instance, in one exemplary embodiment a method for supporting a planar electronic device is disclosed, with such method comprising providing an electronic device holder comprising a body having a tapered portion and a plurality of pairs of brackets. Each of the brackets in the plurality of pairs of brackets have the same vertical position and arranged along the tapered portion.

The method also includes receiving the electronic device holder in a compartment such that the electronic device holder is retracted in the compartment, and extending the electronic device holder relative to the compartment. When the electronic device holder is extended and not retracted, the planar electronic device is supported with at least one pair of the plurality of brackets.

The electronic device holder may be secured in the compartment when the electronic device holder is retracted. In addition, a wireless charging device may be provided to charge the planar electronic device when the planar electronic device is proximate the body.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 15 is a perspective view of an exemplary stowable tiered electronic device holder in a retracted position;

FIG. 16 is a perspective view of an exemplary stowable tiered electronic device holder in an extended position.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the tiered electronic device holder herein provides a support that can hold a variety of electronic devices in various orientations. Some exemplary electronic devices include portable electronic devices such as smartphones, tablets, convertible laptops, media players, and portable gaming machines. The tiered electronic device holder is advantageous in that it permits electronic devices of a wide variety of sizes to be held or otherwise supported for handsfree operation. In addition, the tiered electronic device holder allows one or more electronic devices to be quickly and easily be received and removed.

Figure 1:
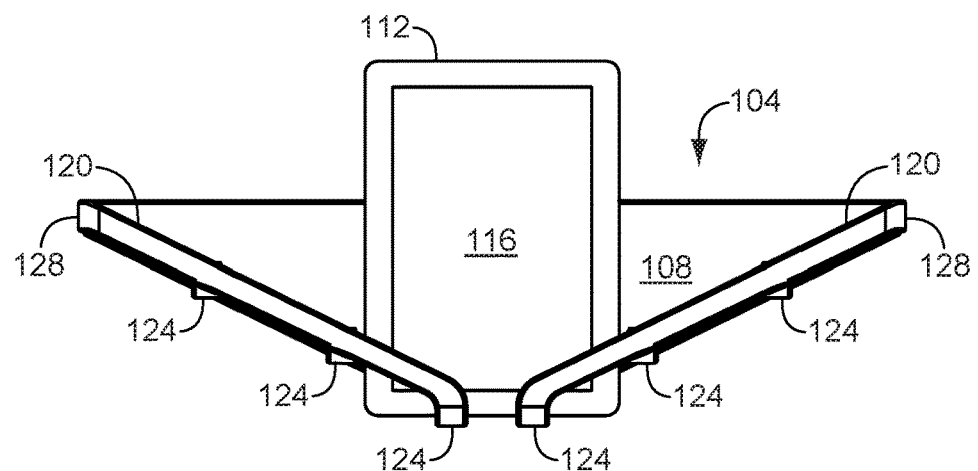
FIG. 1 is a front view of an exemplary tiered electronic device holder in operation.

FIG. 1 illustrates a front view of an exemplary tiered electronic device holder 104 in operation. In FIG. 1, a planar electronic device 112, such as a tablet or smartphone, is supported by the tiered electronic device holder 104.

Figure 2:
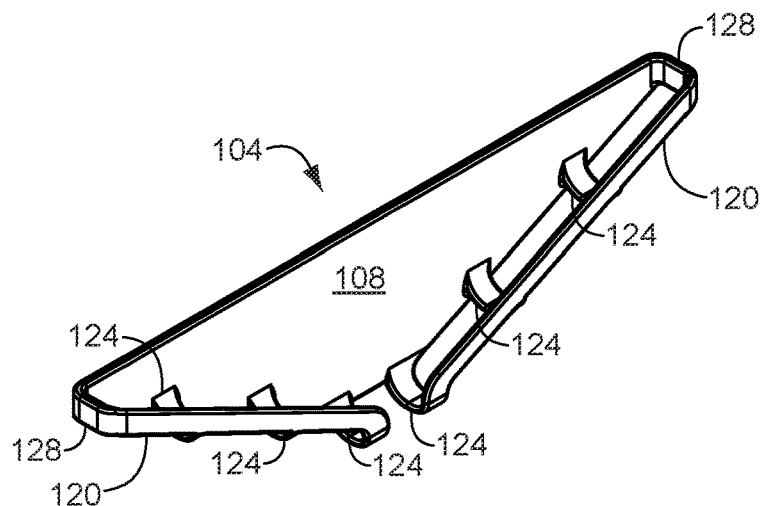
FIG. 2 is a top perspective view of an exemplary tiered electronic device holder.
Figure 3:
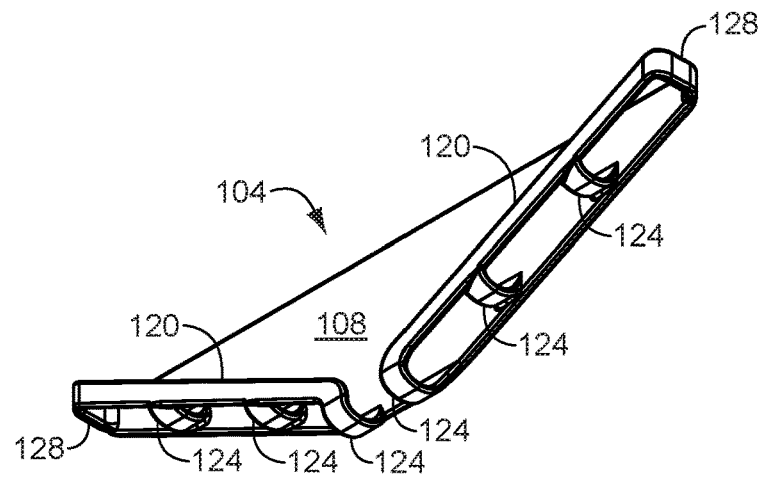
FIG. 3 is a bottom perspective view of an exemplary tiered electronic device holder.

Referring to FIGS. 2 and 3, which respectively illustrate a top perspective view and a bottom perspective view, it can be seen that a tiered electronic device holder 104 may comprise a body 108 at its back end. The body 108 may be a planar structure that may be tapered, such as to form a "V" shape. A plurality of brackets 124 may be positioned diagonally along a surface of the body 108. To illustrate, one or more brackets may be positioned along a tapered edge of the body 108, or along a "V" or "U" shaped path such as shown in FIGS. 1-3. Each bracket 124 may extend outward from the body 108 and provide a structure that engages an electronic device 112 when the electronic device is received by a tiered electronic device holder 104.

In one or more embodiments, a bracket 124 may be an arcuate structure that receives an electronic device 112 in a concave portion of the arcuate structure. This provides a structure that cradles a bottom end or edge of an electronic device 112 to hold the same in position. As shown in FIG. 1 for example, a bottom edge of the electronic device 112 engages a concave portion of the bottommost brackets 124. This holds the electronic device 112 upright such that its display screen 116 can be readily viewed by a user.

Brackets 124 may be positioned in a stepped or tiered manner, such as shown in FIGS. 1-3. As will be described further below, this allows electronic devices having a wide variety of sizes and shapes to be supported by the tiered electronic device holder 104. In addition, the tiering of brackets 124 permits electronic devices of various shapes and sizes to be supported in portrait, landscape and other orientations.

Brackets 124 may be provided in pairs in one or more embodiments, with each bracket of a pair having the same or substantially the same vertical position. This allows a pair of brackets 124 to hold an electronic device 112 level.

One or more rails 120 may be provided to support a front end of one or more brackets 124. Typically, a rail 120 will be a thin elongated structure so as to not obscure a display screen 116 of an electronic device. A rail 120 may be planar as well. Alternatively or in addition, it is contemplated that a rail 120 may be transparent in one or more embodiments. For example, a rail 120 may be formed from a transparent material, such as plastic, plexiglass, acrylic or the like.

A rail 120 may be positioned diagonally, such as to correspond to the taper of a body 120. As can be seen from FIGS. 1-3 for example, one or more rails 120 may be parallel to the tapered edge of a body 120. Rails 120 may form a tapered shape, such as a "V" shape, in this manner.

A rail 120 may comprise a flange 128 at one or both of its ends that connect the rail to a body 108. In some embodiments, bracket 124 may be at one or both ends of a rail 120 and connect the rail to a body 108. As shown in FIGS. 1-3 for example, the rails 120 are attached to the body 108 by a bracket 124 at one end of each rail and by a flange 128 at the other end of each rail. Individual rectangular loops, such as can be seen in FIG. 3, may be formed by rails 120 and their connecting structures (i.e., flanges 128, brackets 124 or both). It is contemplated that a flange 128 need not be provided in all embodiments since one or more brackets 124 may be used to connect a rail 120 to a body 108.

Though shown as having a body 108 at its back end and one or more rails 120 at its front end, it will be understood that a tiered electronic device holder 104 may comprise one or more rails 120, rather than a body 108, at its back end. Alternatively, a tiered electronic device holder 104 may comprise a body 108 at its back end and front end. In such an embodiment, at least the body 108 at the front end may be formed from a transparent material to permit viewing and use of an electronic device 112. In other words, a body 108 and rails 120 may be interchangeable structures in some embodiments.

In some embodiments, a rail 120 need not be provided. For example, a tiered electronic device holder 104 may simply have outwardly extending brackets 124 in some embodiments. Such brackets 124 may be arcuate or angled so as to prevent a bottom edge of an electronic device 112 from sliding off a bracket.

Figure 4:
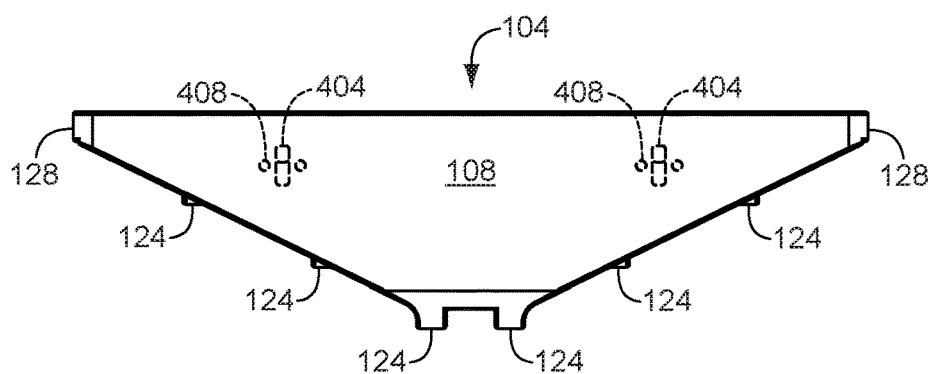
FIG. 4 is a back view of an exemplary tiered electronic device holder.

FIG. 4 illustrates a back view of an exemplary tiered electronic device holder 104. As can be seen, one or more mounts 404 may be provided to secure a tiered electronic device holder 104 at its back end. In one or more embodiments, a mount 404 may be secured to a body 108 of a tiered electronic device holder 104. A mount 404 may be a clip, hook, hanger, magnet, suction cup or the like. In general, a mount 404 will be a structure that secures a tiered electronic device holder 104 to another structure. It is contemplated that one or more mounting orifices 408 of various shapes may be formed to allow one or more fasteners, such as screws, rivets, pins or the like, to secure a tiered electronic device holder to another structure.

Figure 5:
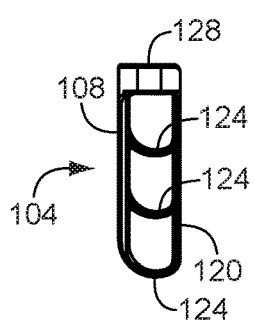
FIG. 5 is a side view of an exemplary tiered electronic device holder.

FIG. 5 illustrates a side view of an exemplary tiered electronic device holder 104. The brackets 124 shown in FIG. 5 illustrate an exemplary arcuate shape for the brackets. As can be seen, each bracket 124 may provide a concave portion for receiving a portion (i.e., an edge) of an electronic device. The electronic device can then be cradled therein to help prevent the electronic device from sliding when received by a tiered electronic device holder 104. In addition, the structure of each rail 120 prevents an electronic device 104 from sliding off a bracket 124 at a front end of a tiered electronic device holder. A body 108 provides a structure that prevents an electronic device from sliding off a bracket at a back end of a tiered electronic device holder 104.

Figure 6:
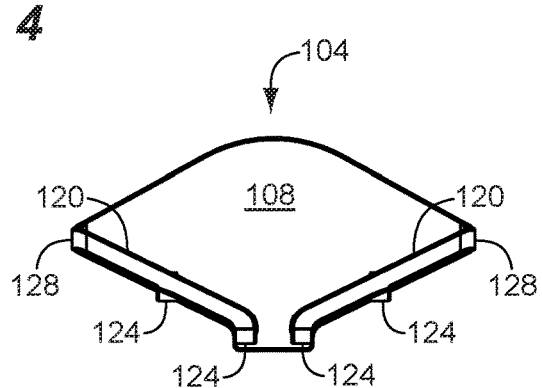
FIG. 6 is a front view of an exemplary tiered electronic device holder.

A tiered electronic device holder 104 may be provided in a variety of shapes and sizes. FIG. 6 illustrates an exemplary embodiment that has a distinct shape and size from the above-described embodiments. Namely, the body 108 in FIG. 6 has a diamond shape. In addition, fewer brackets 124 are provided and the overall shape of the embodiment in FIG. 6 is smaller.

It is noted that the diamond shape of the body 108 may be advantageous for engaging a back end of an electronic device, to hold the electronic device in an upright position. The diamond shape provides an elongated surface that may engage a back end of an electronic device to prop the electronic device up in an upright position, such as shown in FIG. 1.

Figure 7:
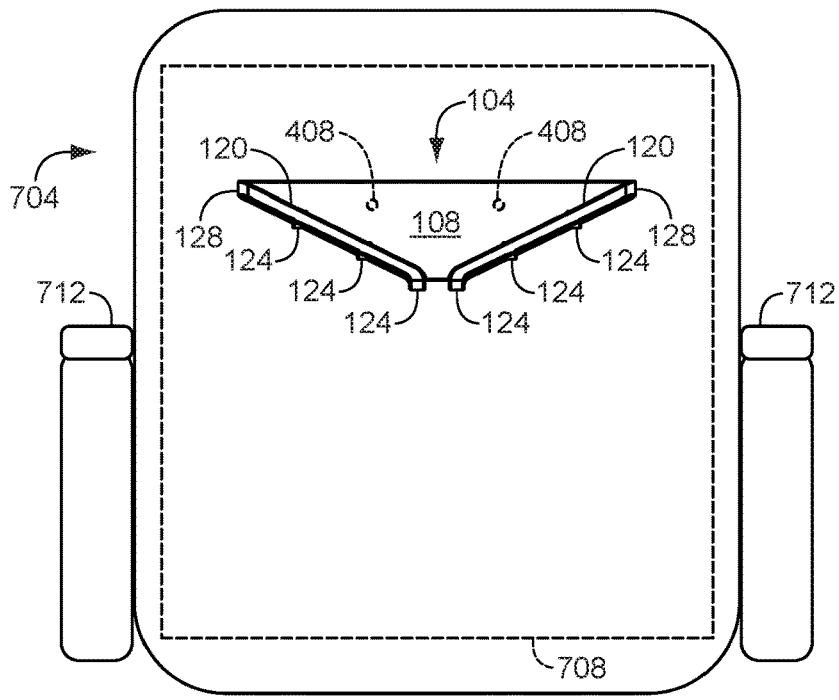
FIG. 7 illustrates an exemplary tiered electronic device holder in an environment of use.

FIG. 7 illustrates an embodiment of a tiered electronic device holder 104 in an exemplary environment of use. In the illustration of FIG. 7, the tiered electronic device holder 104 is secured to a structure 708 that is part of a seat 704 having armrests 712. As can be seen, such seat 704 may be a passenger seat, such as of an aircraft, bus, car, boat or other vehicle. A tiered electronic device holder 104 may also be secured to other seating, such as seats of a stadium, theater, concert hall or other venue. As can be seen, one or more orifices 408 (or mounts) may accept a fastener to secure a tiered electronic device holder 104 to a structure 708.

Though shown secured to a seat 704, it is contemplated that a tiered electronic device holder 104 may be attached to a variety of structures 708. Some exemplary structures 708 include, walls, doors, and other vertical or generally vertical surfaces. A tiered electronic device holder 104 may also be attached to one or more support arms in some embodiments.

Operation of an exemplary tiered electronic device holder 104 will now be described with regard to FIGS. 8 and 9. As can be seen, a tiered electronic device holder 104 may support a variety of electronic devices with a variety of shapes and sizes. To illustrate, the tiered electronic device holder 104 supports an electronic device 112 in the form of a smartphone in FIG. 8, while an electronic device 112 in the form of a tablet is support in FIG. 9. Each electronic device 112 is supported in an upright position to permit viewing of its display screen 116 and use of the electronic device.

An electronic device 112 will typically be supported by a set of brackets 124, such as shown. In general, an electronic device 112 will be between the pair of brackets 124 that are spaced apart enough to receive the electronic device, while being supported by one or more lower brackets. To illustrate, in FIG. 8 the electronic device 112 is between the second lowermost pair of brackets 124 with the lowest positioned brackets supporting a bottom edge of the electronic device. In FIG. 9, the increased width of the electronic device 112 causes it to be received between the second highest pair of brackets 124, while one or more brackets immediately below support a bottom edge of the electronic device.

As can be seen, in each position, an electronic device 112 may be between a pair of brackets 124. This helps prevent the electronic device from sliding laterally off of the one or more brackets that are supporting it. It is noted that, if place upon the highest brackets 124, a pair of flanges 128 may prevent an electronic device 112 from sliding laterally off such brackets.

In use, a user would locate their electronic device 112 over one or more brackets 124 and then lower the electronic device until an edge thereof is supported by the one or more brackets. The electronic device 112 may be positioned laterally such that it is received between a pair of brackets 124 or flanges 128, such as described above. An electronic device 112 will typically be rotated such that its display screen 116 is visible and accessible, such as shown in FIGS. 8 and 9.

Figure 8:
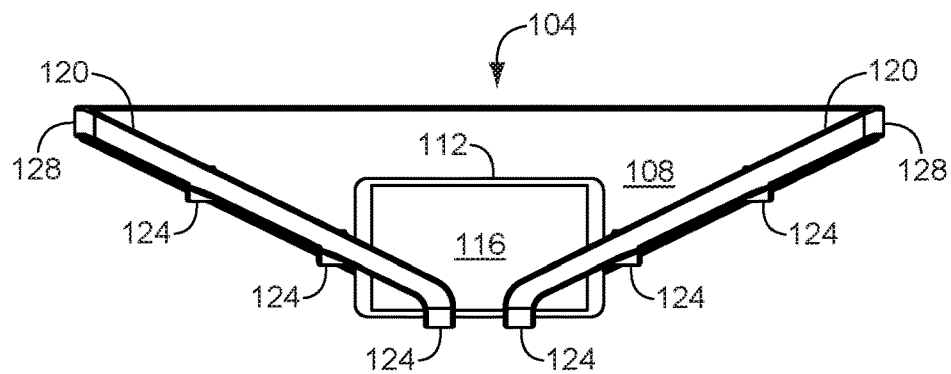
FIG. 8 is a front view of an exemplary tiered electronic device holder in operation.
Figure 9:
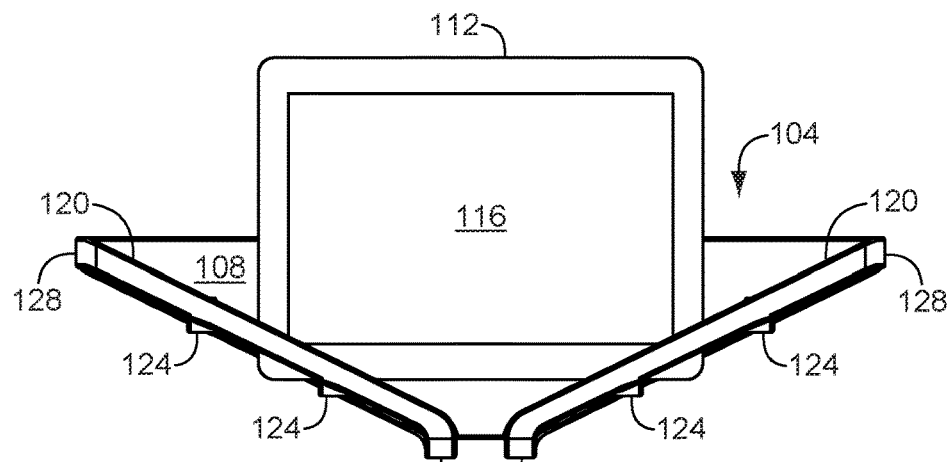
FIG. 9 is a front view of an exemplary tiered electronic device holder in operation.

FIGS. 8 and 9 illustrate electronic devices 112 in a landscape orientation. Referring back to FIG. 1, it can be seen, that electronic devices 112 may also be supported in a portrait orientation by the procedure described above. When desired, a user may remove their electronic device 112 by lifting the electronic device such that it disengages the brackets 124 and is removed from the tiered electronic device holder 104.

Figure 10:
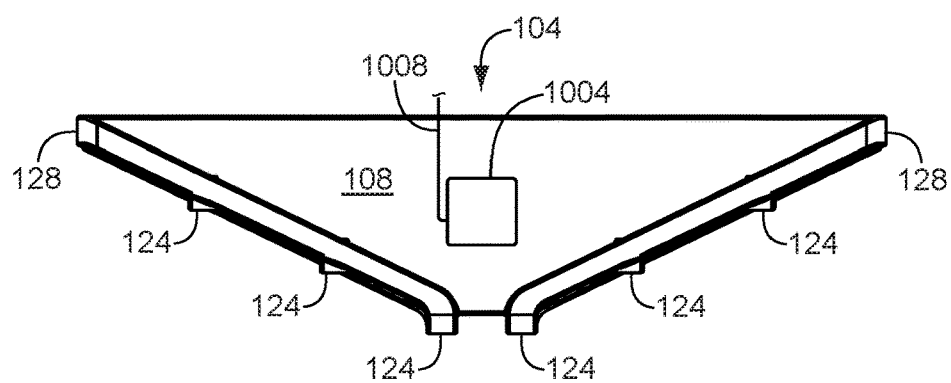
FIG. 10 is a front view of an exemplary tiered electronic device holder.

FIG. 10 illustrates an electronic embodiment of a tiered electronic device holder 104. As can be seen, an induction charger or other wireless charging device 1004 may be provided at a back end of a tiered electronic device holder 104. A wireless charging device 1004 may comprise a sensor that detects the presence of an electronic device 112 in a tiered electronic device holder 104 and automatically begins transmission of power to charge the electronic device. A wireless charging device 1004 may be connected to various power supplies, such as batteries, vehicle power, utility power or other power source, such as via one or more electrical connectors 1008.

In one or more embodiments, a tiered electronic device holder 104 may be stowable. As can be respectively seen from FIGS. 11 and 12, a tiered electronic device holder 104 may transition between a retracted and extended position. In the retracted position, a tiered electronic device holder 104 may be retracted or stowed such that it does not protrude outward. In the extended position, a tiered electronic device holder 104 may extend or protrude outward to receive and support one or more electronic devices. This functionality is advantageous in environments of use where a protrusion from a seat back may pose a safety concern. In addition, a wireless charging device 1004 may be provided to power or charge an electronic device, such as described above.

Figure 11:
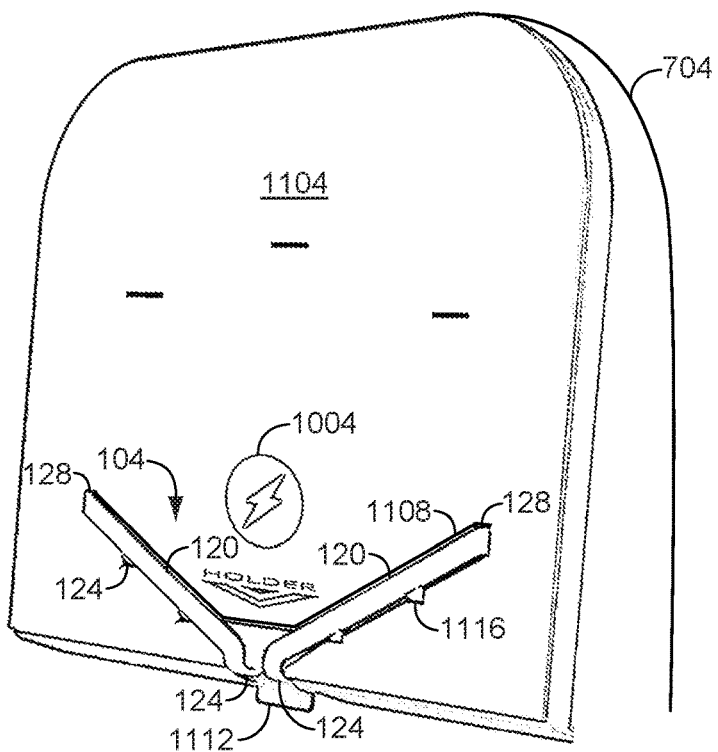
FIG. 11 is a perspective view of an exemplary stowable tiered electronic device holder in a retracted position.
Figure 12:
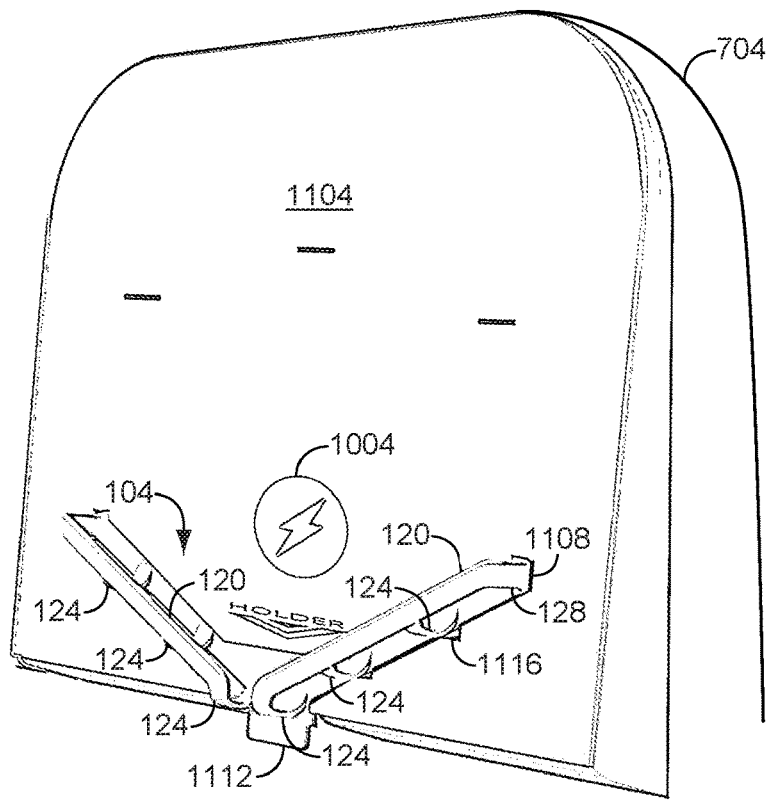
FIG. 12 is a perspective view of an exemplary stowable tiered electronic device holder in an extended position.

A stowable embodiment of a tiered electronic device holder 104 will typically include a shroud, enclosure or other type of housing 1104. A housing 1104 may be a portion of an aircraft seat. For example, FIGS. 11 and 12 illustrate a housing 1104 in the form of a back panel of an aircraft seat. It is contemplated that a housing 1104 may be manufactured with or used to retrofit an aircraft seat. Though shown and described with regard to aircraft seating, it will be understood that a stowable tiered electronic device holder 104 may be installed on or integrated with various vehicular or other seats.

A housing 1104 will typically comprise one or more compartments 1108 that facilitate extension and retraction of a tiered electronic device holder 104. Namely, a compartment 1108 may provide a open area capable of receiving a tiered electronic device holder 104, such that it does not protrude outward from a housing 1104.

In one or more embodiments, a compartment 1108 may correspond in shape to the peripheral shape of a tiered electronic device holder 104, such as shown. In this manner, the compartment 1108 forms a guide according to which a tiered electronic device holder 104 may extend and retract in a predictable manner. In the embodiments shown in FIGS. 11 and 12 for instance, the tiered electronic device holder 104 extends and retracts in a linear manner.

Alternatively or in addition, a housing may comprise one or more tracks 1116 to guide the extension and retraction of a tiered electronic device holder 104. A track 1116 may be a structure that engages only a portion of a tiered electronic device holder 104 and guides or limits the motion of the tiered electronic device holder. As can be seen from FIGS. 11 and 12 for example, one or more tracks 1116 may engage corresponding brackets 124 of a tiered electronic device holder 104 to guide extension and retraction of the tiered electronic device holder. During extension and retraction, a bracket 124 (or other portion of a tiered electronic device holder 104) may slide or move along its track 1116.

It is contemplated that one or more pegs or other outward extending members and corresponding openings may be used to facilitate extension and retraction of a tiered electronic device holder 104. Such structures may guide the movement of a tiered electronic device holder 104 during extension and retraction.

A handle 1112 may extend from a tiered electronic device holder 104 in some embodiments, such as to allow a user to more easily extend or retract the tiered electronic device holder. As shown, the handle 1112 is a structure that allows a user to pull or push a tiered electronic device holder 104 to extend or retract the tiered electronic device holder.

Figure 13:
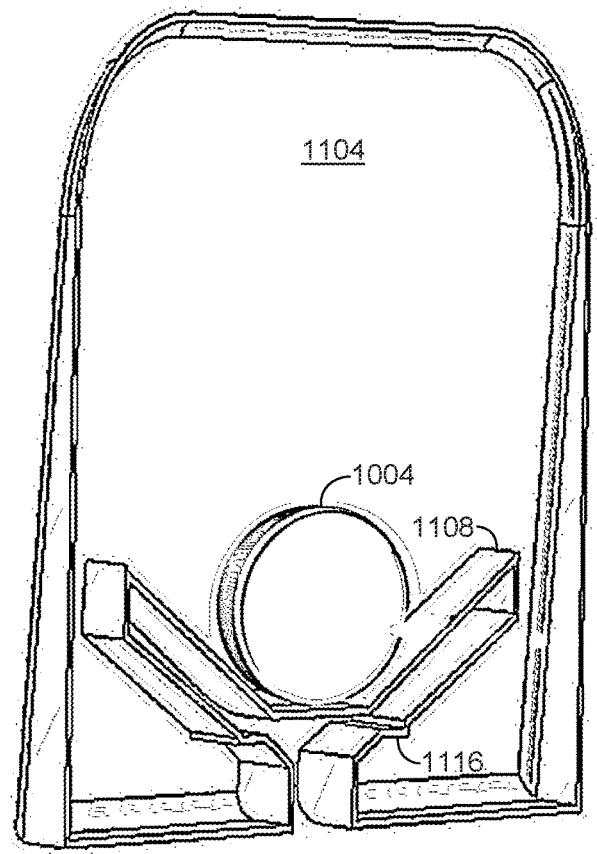
FIG. 13 is a back perspective view of an exemplary housing.

FIG. 13 illustrates a back perspective view of an exemplary housing 1104 and compartment 1108. As can be seen, the periphery or walls of a compartment 1108 may extend internally to provide an open area to receive a tiered electronic device holder 104 such that it does not protrude outward when retracted. In addition, it can be seen that a compartment 1108 may correspond in shape to a tiered electronic device holder 104 to guide the extension and retraction thereof.

A housing 1104 may have a depth sufficient to house a compartment 1108. As shown in the exemplary embodiment of FIG. 13, a bottom end of the housing 1104 is enlarged to accept the compartment 1108. A wireless charging device 1004 may also be housed within the housing 1104. It is noted that a housing 1104 need not be tapered in all embodiments.

It is contemplated that a compartment 1108 may be tapered in one or more embodiments. For example, the periphery or walls of a compartment 1108, or various portions thereof, may constrict as it extends from the front to the back of its housing 1104. In this manner, a tiered electronic device holder 104 may be frictionally secured as it is pushed or otherwise moved into a compartment 1108 during retraction. This is advantageous in keeping a tiered electronic device holder 104 retracted unless a user wishes to extend the tiered electronic device holder.

Figure 14:
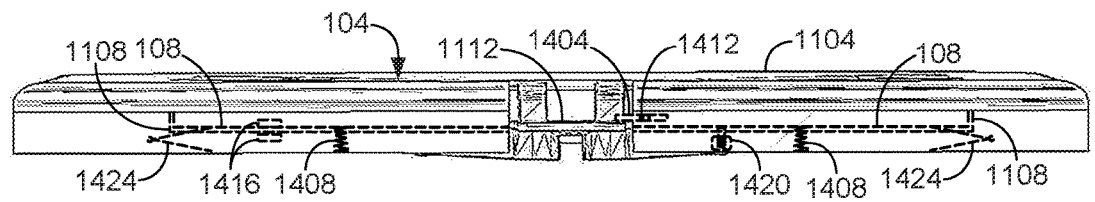
FIG. 14 is a bottom view of an exemplary stowable tiered electronic device holder in a retracted position.

A tiered electronic device holder 104 may be secured in a retracted position in various ways. As shown in FIG. 14 for example, one or more latches 1404, biasing devices 1408, such as springs, or both may secure a tiered electronic device holder. A latch 1404 or tab may be used to counteract a force provided by a biasing device 1408, such as to hold a tiered electronic device holder 104 in an extended position or a retracted position. A latch 1404 or tab may alternatively engage a tiered electronic device holder 104 to secure the tiered electronic device holder in a particular position.

A latch 1404 or tab may engage a corresponding indentation, opening or other structure to secure a tiered electronic device holder 104 in one or more embodiments. As shown in FIG. 14 for example, a latch 1404 engages a handle 1112 to secure a tiered electronic device holder 104 in position. Likewise, disengagement of the latch 1404 or tab allows the tiered electronic device holder 104 to be moved between positions. As shown, a latch 1404 may have a knob 1412 or the like to allow a user to more easily actuate or manipulate the same.

It is contemplated that a biasing device 1408 may be used to pull or otherwise force a rail or other portion of a tiered electronic device holder 104 against an electronic device 112 to clamp or otherwise secure the electronic device in the tiered electronic device holder 104. To illustrate, a biasing device 1408 may apply an inward directed force on a tiered electronic device holder 104. After an electronic device 112 is received by the tiered electronic device holder 104, such force causes one or more rails, brackets or other portions of the tiered electronic device holder to engage and apply pressure on the electronic device. This secures the electronic device 112 in the tiered electronic device holder 104.

One or more biasing devices 1408 may be attached to a portion of a tiered electronic device holder 104, such as a body 108 thereof. The opposite end of a biasing device 1408 may be attached to another structure, such as a housing 1104. In this manner, a biasing device 1408 can apply a force upon a tiered electronic device holder 104 to bias the tiered electronic device holder to an extended or retracted position.

In one or more embodiments, a push to release device 1420 may be provided. A push to release device 1420 that may be depressed to release an internal biasing device. The internal biasing device applies an outward force on the body 108 or other portion of a tiered electronic device holder 104 to extend the same. Pushing the tiered electronic device holder 104 compresses the internal biasing device of a push to release device 1420, which is then locked in a compressed state, holding the tiered electronic device holder in retracted position.

As alluded to above, a tiered electronic device holder 104 may comprise various mechanisms for extending, retracting and being secured in such positions. For instance, it is contemplated that one or more pivots or hinges 1424 may be used to facilitate extension and retraction of a tiered electronic device holder 104. A hinge 1424 may extend between a body 108 or other portion of a tiered electronic device holder 104 and a housing 1104, compartment 1108 or other structure.

FIGS. 15 and 16 respectively illustrate another embodiment of a tiered electronic device holder 104 that can be stowed in a retracted position and extended for use. As can be seen, a hinge 1504, pivot or other rotatable mount may be used to mount a tiered electronic device holder 104 such that it may be extended from and retracted into a compartment 1108. In one or more embodiments, a hinge 1504 may rotatably connect a body 108 of a tiered electronic device holder 104 to a wall or other portion of a compartment 1108. Though shown as being attached to a top portion of the body 108, it is contemplated that a hinge 1504 may be attached to various portions or structures of a tiered electronic device holder 104.

As described above, a compartment 1108 may be sized to receive a tiered electronic device holder 104 such that it does not protrude outward therefrom when in a retracted position. As shown in FIG. 15 for example, the compartment 1108 receives the tiered electronic device holder 104 therein. In addition, though not required in all embodiments, the shape of the compartment 1108 generally conforms to the peripheral shape of its tiered electronic device holder 104.

A compartment 1108 may be held by or part of a housing 1104, such as described above. As shown in FIGS. 15 and 16 for example, a housing 1104 may be part of a seat back. It is contemplated that the housing 1105 may be similar to that shown in FIG. 13.

A handle 1112 may be provided to aid in moving a tiered electronic device holder 104 between an extended and retracted position. To illustrate, a user may pull a handle 1112 to move a tiered electronic device holder 104 from the retracted position in FIG. 15 to the extended position in FIG. 16. A handle 1112 may also be used to move a tiered electronic device holder 104 back to a retracted position.

One or more fasteners 1604 may be provided to secure a tiered electronic device holder 104 in a retracted position. Some exemplary fasteners 1604 include magnets, clips, snap fittings and the like. It is contemplated that a hinge 1504 may contain or be connected to a biasing device, such as a spring, that applies a force to secure a tiered electronic device holder 104 in a retracted position. A latch, such as described above, may also be used to secure a tiered electronic device holder 104 in a particular position.

Figure 17:
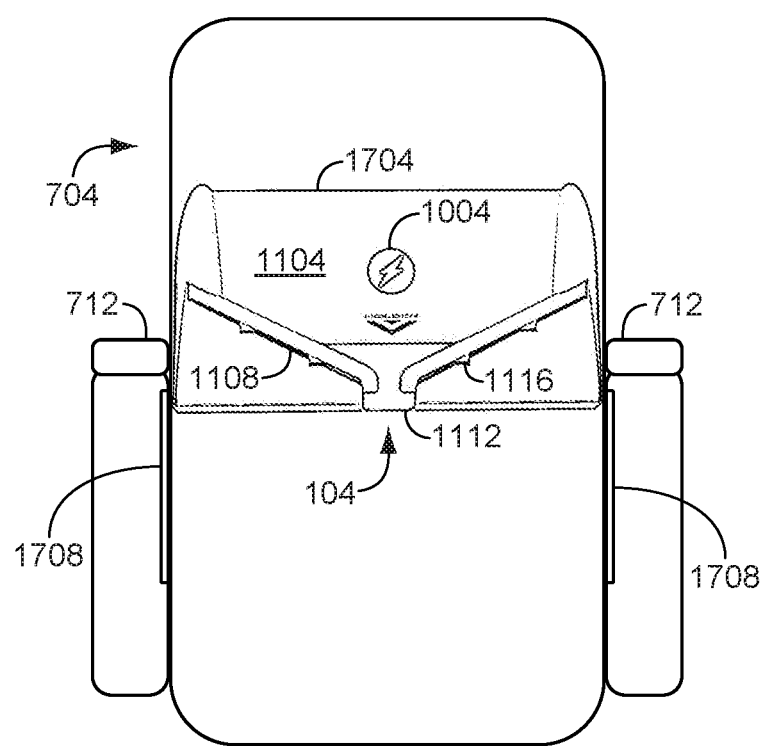
FIG. 17 illustrates an exemplary stowable tiered electronic device holder in an environment of use.

FIG. 17 illustrates an exemplary embodiment where a tiered electronic device holder 104 is part of a tray table 1704. As can be seen, a tray table 1704 may be movably mounted to a aircraft or other seat 704 to permit the tray table to be moved between a stowed position and a service position. An exemplary stowed position, where a tray table 1704 adjacent a seat back, is illustrated in FIG. 17. In a service position, a tray table 1704 will typically be extended outward from its seat 704 and provide a generally horizontal surface upon which various items may be placed. As shown, a tray table 1704 may be movably mounted to a seat 704 or other structure by one or more arms 1708. Such arms 1708 may be rotatably mounted to the tray table 1704 and seat 704 by one or more rotatable mounts, such as pivots.

It is contemplated that a tray table 1704 may form or provide a housing 1104 having a compartment 1108 for receiving a tiered electronic device holder 104. In such embodiments, a tiered electronic device holder 104 may be extended and retracted as described above. Typically, a tiered electronic device holder 104 will extend from a bottom end of a tray table 104, such as shown. In this manner, a tiered electronic device holder 104 will be accessible when the tray table 104 is in a stowed position.

In use, a tiered electronic device holder 104 may be extended to receive an electronic device, such as shown and described with regard to FIGS. 8 and 9. In such position, a tiered electronic device holder's brackets 124 support an electronic device 112 such that user may view and interact with its display screen 116. The user may subsequently remove their electronic device 112 and return the tiered electronic device holder 104 to a retracted position. In the retracted position, a tiered electronic device holder 104 may be stowed so as to not protrude outward from its housing 1104, compartment 1108 or both. As described above, this is advantageous to user safety as it helps prevent contact with the tiered electronic device holder 104 especially when used in a moving vehicle.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A stowable electronic device holder for a vehicle seat comprising:
    a housing attached to the vehicle seat;
    an electronic device holder comprising a body having a tapered portion and a plurality of pairs of brackets, each pair of brackets including two brackets having the same vertical position and the plurality of pairs of brackets being arranged along the tapered portion; and
    a compartment in the housing that receives the electronic device holder, wherein the electronic device holder is movable between a retracted position and extended position relative to the compartment.

2. The electronic device holder of claim 1, further comprising a wireless charging device at the body.

3. The electronic device holder of claim 1, wherein the compartment has a shape that corresponds to a peripheral shape of the electronic device holder.

4. The electronic device holder of claim 1, wherein the housing is a tray table.

5. A stowable electronic device holder for a vehicle seat comprising:
    an electronic device holder comprising a body having a tapered portion and a plurality of pairs of brackets, each of the brackets in the plurality of pairs of brackets arranged along the tapered portion; and
    a compartment that receives the electronic device holder, wherein the electronic device holder is movable between a retracted position and extended position relative to the compartment;
    wherein the compartment is secured to the vehicle seat.

6. The electronic device holder of claim 5, further comprising a wireless charging device at the body.

7. The electronic device holder of claim 5, wherein the compartment has a shape that corresponds to a peripheral shape of the electronic device holder.

8. A method for supporting a planar electronic device with an electronic device holder at a vehicle seat, the electronic device holder comprising a body having a tapered portion and a plurality of pairs of brackets, each of the brackets in the plurality of pairs of brackets having the same vertical position and arranged along the tapered portion, the method comprising;
    receiving the electronic device holder in a compartment, wherein the electronic device holder is retracted in the compartment;
    extending the electronic device holder relative to the compartment; and
    when the electronic device holder is extended and not retracted, supporting the planar electronic device with at least one pair of the plurality of brackets.

9. The method of claim 8 further comprising securing the electronic device holder in the compartment when the electronic device holder is retracted.

10. The method of claim 8 further comprising providing a wireless charging device that charges the planar electronic device when the planar electronic device is proximate the body.

* * * * *